(12) United States Patent
Widergren et al.

(10) Patent No.: US 8,028,173 B2
(45) Date of Patent: Sep. 27, 2011

(54) CONTENT DISTRIBUTION SYSTEMS AND METHODS

(75) Inventors: Robert D. Widergren, Morgan Hill, CA (US); Paul Germeraad, Saratoga, CA (US)

(73) Assignee: Mo-DV, Inc., Campbell, CA (US)

( * ) Notice: Subject to any disclaimer, the term of this patent is extended or adjusted under 35 U.S.C. 154(b) by 0 days.

(21) Appl. No.: 12/184,483

(22) Filed: Aug. 1, 2008

(65) Prior Publication Data

US 2008/0288106 A1    Nov. 20, 2008

Related U.S. Application Data

(63) Continuation of application No. 10/970,840, filed on Oct. 20, 2004, now abandoned.

(60) Provisional application No. 60/512,947, filed on Oct. 20, 2003.

(51) Int. Cl.
*G06F 12/14* (2006.01)

(52) U.S. Cl. .................. 713/193; D20/1; D20/2; D20/3; D20/4; D20/5; D20/6; D20/7; D20/8; D20/9

(58) Field of Classification Search .................. 713/193; D20/1–9
See application file for complete search history.

(56) References Cited

U.S. PATENT DOCUMENTS

| | | | | |
|---|---|---|---|---|
| 5,506,575 A | 4/1996 | Ormos | ..................... | 340/825.31 |
| 5,633,839 A * | 5/1997 | Alexander et al. | ............ | 700/234 |
| 5,734,823 A | 3/1998 | Saigh et al. | ............... | 395/200.06 |
| 5,734,891 A | 3/1998 | Saigh | ............................ | 395/610 |
| 5,796,825 A * | 8/1998 | McDonnal et al. | ............ | 713/165 |
| 5,959,945 A * | 9/1999 | Kleiman | ......................... | 381/81 |
| 6,232,539 B1 * | 5/2001 | Looney et al. | .................. | 84/609 |
| 6,389,399 B1 * | 5/2002 | Yasuda | ........................ | 704/500 |
| 6,466,920 B1 * | 10/2002 | Okayama et al. | ............... | 705/57 |
| 6,496,802 B1 * | 12/2002 | van Zoest et al. | ............... | 705/14 |
| 6,581,841 B1 * | 6/2003 | Christoffersen | .............. | 235/492 |
| 6,687,683 B1 | 2/2004 | Harada et al. | ................... | 705/51 |
| 6,697,306 B2 * | 2/2004 | Sako | ......................... | 369/47.12 |
| 6,961,858 B2 * | 11/2005 | Fransdonk | ..................... | 726/29 |
| 6,993,509 B2 * | 1/2006 | Vidich et al. | .................... | 705/51 |
| 7,039,944 B1 * | 5/2006 | Cho et al. | .......................... | 726/2 |
| 7,191,153 B1 * | 3/2007 | Braitberg et al. | ............... | 705/51 |
| 7,206,941 B2 * | 4/2007 | Raley et al. | .................... | 713/193 |

(Continued)

FOREIGN PATENT DOCUMENTS

EP    1081616 A2    3/2001

(Continued)

OTHER PUBLICATIONS

International Search Report and Written Opinion, PCT/US04/34950, Feb. 16, 2005, 4 pages.

(Continued)

*Primary Examiner* — Kambiz Zand
*Assistant Examiner* — William Powers
(74) *Attorney, Agent, or Firm* — Morgan, Lewis & Bockius LLP

(57) ABSTRACT

An electronic device comprises a first interface operable to receive from a user a selection of a first data set and a processor coupled to the first interface. The processor is operable to access the selected first data set, determine if the user is authorized to receive the first data set, and store the first data set on a memory device.

28 Claims, 3 Drawing Sheets

U.S. PATENT DOCUMENTS

| | | | |
|---|---|---|---|
| 2002/0046404 A1* | 4/2002 | Mizutani | 725/58 |
| 2003/0040838 A1* | 2/2003 | Lagunzad et al. | 700/232 |
| 2003/0084283 A1* | 5/2003 | Pixton | 713/163 |
| 2004/0139312 A1* | 7/2004 | Medvinsky | 713/150 |

FOREIGN PATENT DOCUMENTS

| | | |
|---|---|---|
| JP | 11-168464 A | 6/1999 |
| JP | 2001-136160 A | 5/2001 |
| JP | 2001-175946 A | 6/2001 |
| JP | 2001-202088 A | 7/2001 |
| JP | 2003-108790 A | 4/2003 |
| JP | 2003-228771 A | 8/2003 |
| JP | 2003-271766 A | 9/2003 |
| WO | WO 01/44893 A2 | 6/2001 |
| WO | WO 01/76128 A2 | 10/2001 |
| WO | WO 02/097781 A1 | 12/2002 |

OTHER PUBLICATIONS

European Search Report for EP 04796016.6 dated May 12, 2011, 5 pgs.

* cited by examiner

CONTENT DISTRIBUTION SYSTEMS AND METHODS

CROSS REFERENCE TO RELATED APPLICATIONS

This application is a continuation to U.S. application Ser. No. 10/970,840, filed Oct. 20, 2004 now abandoned, which claims priority to U.S. Provisional Patent Application No. 60/512,947, filed on Oct. 20, 2003, both of which are hereby incorporated by reference in their entireties.

BACKGROUND OF THE INVENTION

Digital media, such as movies, music and games, are increasingly popular. Although several prominent systems, such as the Internet and/or cellular communications, of accessing digital files exist, these systems assume that the party wishing to receive the files has a medium to which to download the files. Moreover, mobility of consumers mandates remote entertainment access for situations where event streaming and download entertainment are not practical.

SUMMARY OF EMBODIMENTS

According to an embodiment of the invention, a content vending device includes memory storing a plurality of data sets and a plurality of computer programs, and a device interface to transfer information to a target device. Each of the computer programs is compatible with a respective operating system of a multiplicity of distinct operating systems, and each of the computer programs is for execution by a respective target device, having the operating system with which the computer program is compatible, for enabling performance of a data set stored on the target device. The target device is a portable device having a respective operating system that is one of the multiplicity of operating systems. The information transferred to the target device includes (A) a data set of the plurality of data sets selected by a user of the target device, and (B) a computer program of the plurality of computer programs that is compatible with the operating system of the target device.

In some embodiments, the data sets are digital multimedia content files. In some embodiments, the content vending device is a self-contained vending device.

DETAILED DESCRIPTION

Figure 1:
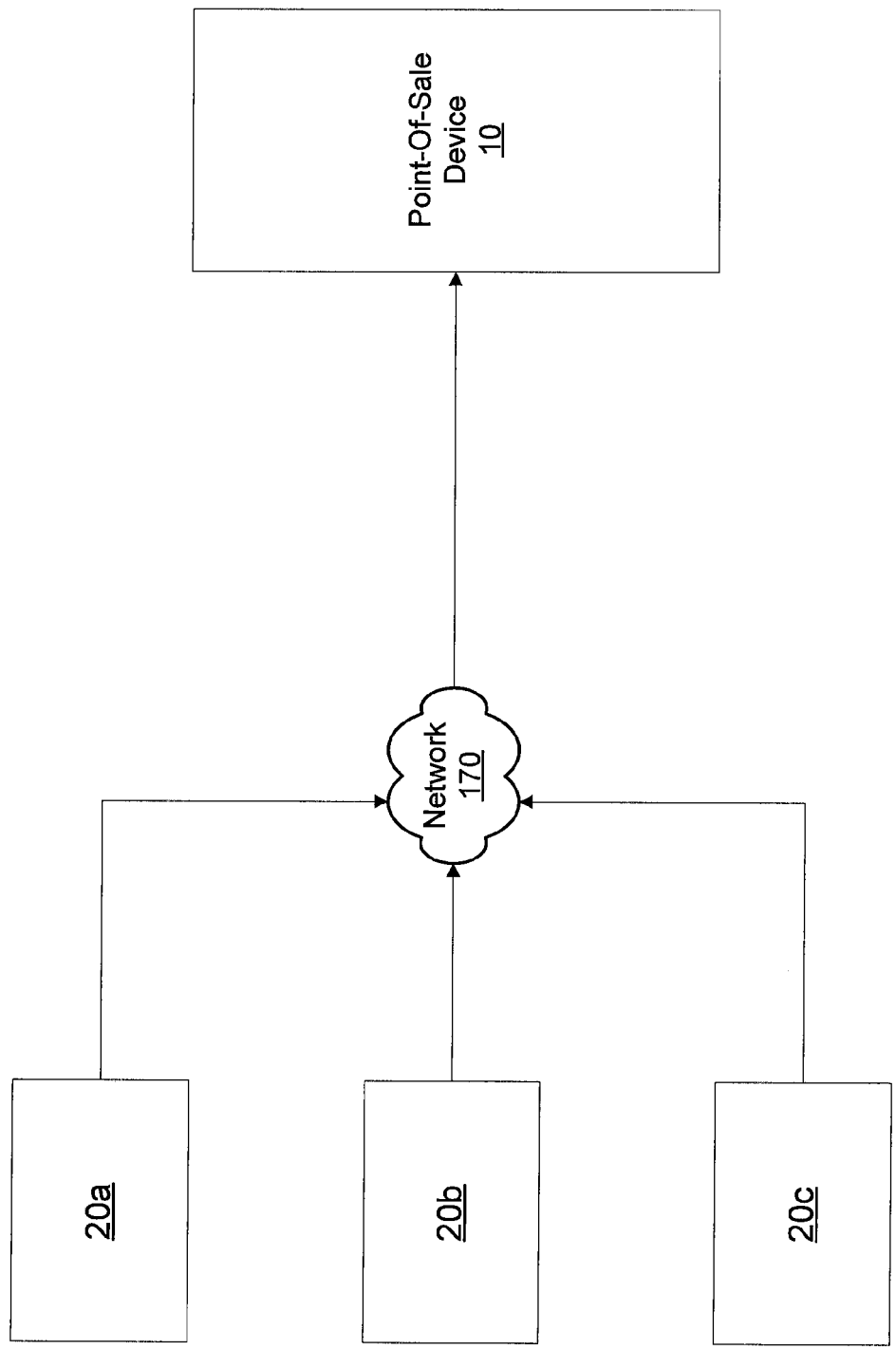
FIG. 1 is a schematic view of a system according to an embodiment of the invention.

FIG. 1 is a schematic view of a point-of-sale (POS) device 10 coupled to a network 170, to which, in turn, are coupled content providers 20, according to an embodiment of the invention. As discussed more fully with reference to FIG. 2, the device 10 is operable to receive from the content providers 20 over the network 170 data sets that comprise content files, such as digital audio files, digital video files (sometimes called digital multimedia content files), still images, text, executable software programs or any other content transmittable in a digital format. The device 10 is further operable to dispense the data sets by storing on a memory device, such as rewriteable digital memory storage media, either supplied by a user or dispensed by the device 10, a data set selected by the user. The device 10 stores the data set on the memory device in exchange for a fee from, or in recognition of another transactional arrangement with, the user. The memory device on which the data set is stored may be coupled or couplable to a client device 30 of the user, such as a personal computer, personal digital assistant, cellular telephone or other electronic device operable to present, for example, the video, audio and/or text associated with the dispensed data set.

Specifically, the device 10 is operable to periodically (e.g., nightly) receive for vending one or more data sets from the content providers 20 over the network 170. The device 10 may also send and receive transactional and other financial information via the network 170. The network 170 may include one or more local-area networks, one or more wide-area networks, such as the Internet, or public switched telephone network. Although the embodiment illustrated in FIG. 1 contemplates the device 10 receiving data sets via electronic transmission over, for example, the network 170, the device 10 may alternatively receive the data files via manual loading of data sets from data storage devices maintained by, for example, an administrator of the device 10.

In an embodiment, the device 10 may be implemented as a fully self contained vending machine or as an operator assisted kiosk operation.

Figure 2:
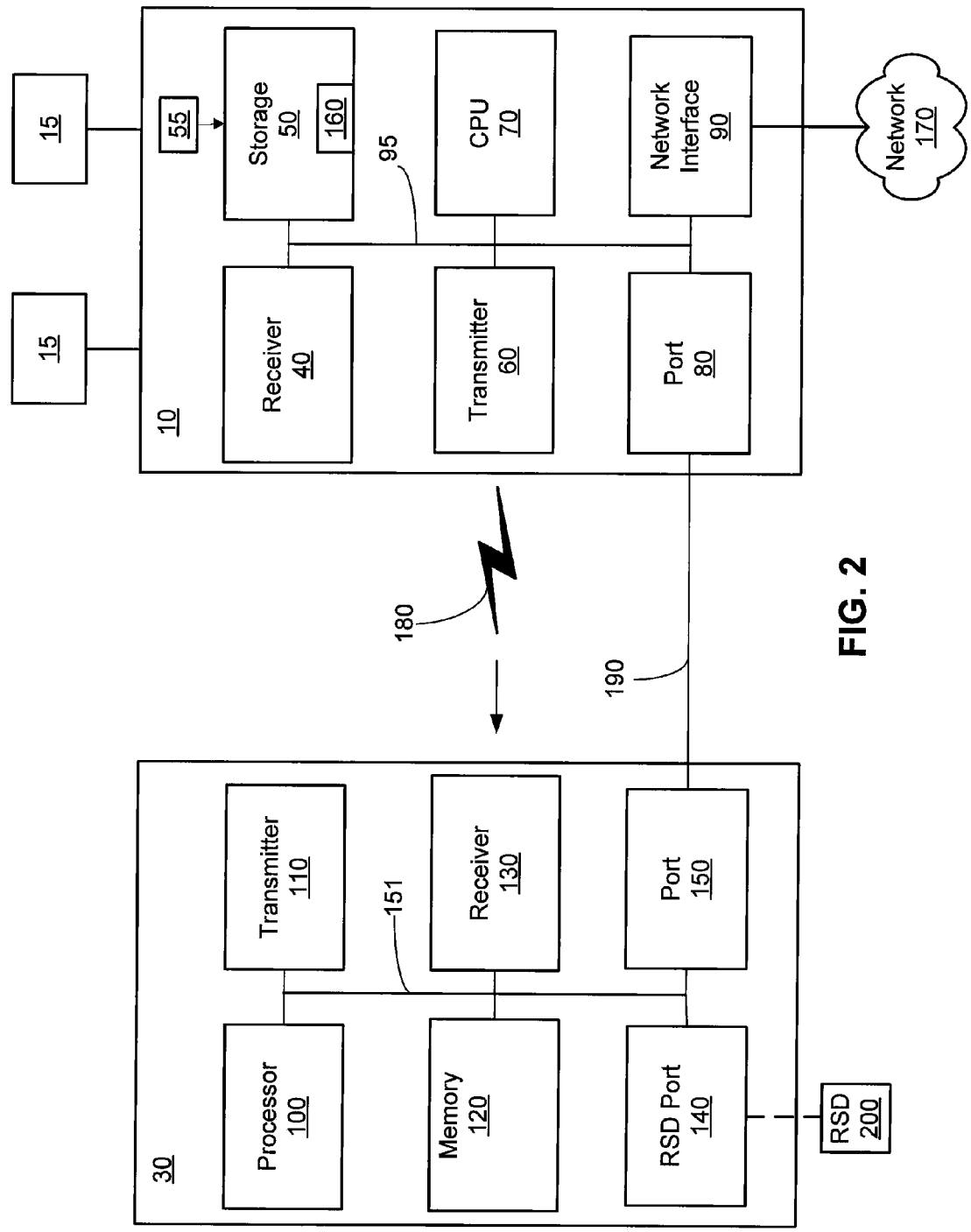
FIG. 2 is a functional block diagram of portions of the system illustrated in FIG. 1 according to an embodiment of the invention.

FIG. 2 illustrates components of and interaction between the device 10 and a client device 30 according to an embodiment of the invention. The device 10 includes the following components: a receiver 40, a storage device 50 such as a hard disk drive, a transmitter 60, a central processing unit (CPU) 70, a port 80, and a network interface 90 according to an embodiment of the invention. A bus 95 couples the device components to one another. In an alternative embodiment, the receiver 40 and/or transmitter 60 may be peripheral devices coupled to the device 10. The device 10 may include a strong physical housing (not shown) with internal power and damage notification elements (not shown) (i.e., Automatic Teller like configurations) to electronically and physically protect content. The storage device 50 may include buffered disks, or other storage media, such as solid-state memory, for permitting high speed loading of content onto drives. The storage device 50 may be capable of write rates of, for example, 35 Mbps to over 400 Mbps.

The device may further include or otherwise be coupled to one or more interface mediums 15 to allow the device 10 and a user to communicate with each other. As used herein, terms of interaction between the device 10 and a user, such as, for example, "receiving," "selecting," "requesting," and the like, are made with reference to use of one or more of the mediums 15, unless otherwise stated. The interface medium 15 may include a video display, speakers, a cursor device, such as a mouse, and/or a keyboard. The medium 15 may further include payment devices that allow the device 10 to receive or otherwise acknowledge payment by the user in exchange for the user receiving the requested data set. Such payment devices may include coin slots, currency accepters, credit-card readers, smart-card readers, and/or radio frequency identification devices.

In an embodiment, the client device 30 includes the following components: a processor 100, a transmitter 110, a memory 120, a receiver 130, a removable storage device (RSD) port 140, and a port 150. A bus 151 couples the client device components to one another.

In operation, according to an embodiment of the invention, a user of the client device 30 wishing to receive a data set for presentation on the client device 30 may communicate to a selection of the data set to the device 10.

For example, the user may prompt the device 10 to execute a software application with which the user may interact via a medium 15. The software application may prompt the user to input information identifying the file. This identifying information may be input to the device 10 by, for example, selecting the data set from a list of data sets generated by the device 10 to the medium 15, or inputting to the medium 15 a title of the data set.

After receiving an identification of the data set requested by the user, the CPU 70 consults a table 160 of available data sets (e.g., digital multimedia content files) that reside in the storage device 50. Alternatively, the CPU 70 may access, via the network interface 90, a similar table (not shown) of available data sets stored, for example, on a remote server (not shown) associated with the network 170.

Still referring to FIG. 2, the CPU 70 identifies the data set requested by the user. In alternative embodiments, the data set may be stored on the storage device 50 or may be retrieved by the device 10 from a remote server (not shown) associated with the network 170.

The device 10 may then prompt the user to pay to receive the requested data set. The device 10 may prompt the user by, for example, generating to the medium 15 a price list for each requested data set. Alternatively, the device 10 may first provide to the user, in a manner described in greater detail below, a "preview" sample portion of the data set to enable the user to evaluate the data set for purchase.

Once the CPU 70 verifies that payment for the data set has been received, the device 10 may then request that the user identify the memory device on which the requested data set shall be stored. Depending on the type and location of the target memory device, the device 10 may store the data set to the target memory device in a variety of ways. For example, in an embodiment, the transmitter 60 transmits the data set via signals 180 to the receiver 130 of the client device 30. The signals 180 may be infrared signals, radio-frequency signals that conform to a communication protocol such as Bluetooth, or any other wireless signals. This arrangement may thus allow near-proximity wireless connectivity (e.g., Infrared, Wi-fi, Bluetooth) for content transfer to computing-platform based storage media (e.g., Bluetooth from device 10 to Cell Phone into MMC card storage on phone).

Alternatively, the CPU 70 can employ the port 80 to communicate the instructions over a cable 190 to the port 150 of the client device 30. The ports 80 and 150 may operate according to any plug-and-socket connection standard such as Universal Serial Bus or IEEE 1394, which are known in the art.

Still alternatively, the port 80 of the device 10 may receive a RSD 200 such as a solid-state CompactFlash device. Consequently, the CPU 70 may store the data set on the RSD 200. The user can then disconnect the RSD 200 from the device 10 and connect it to the RSD port 140 of the client device 30 so that the client device can download the data set from the RSD via the RSD port. The port 80 may be configured to accommodate the entire favorite digital camera storage media forms (e.g., Memory stick, MMC card, SD, Compact Flash etc), USB ports, PDA Cell-phone format storage forms, all for writing/write-checking the data set into a memory.

In an embodiment, the port 80 is operable to lock, in a manner known in the art, the RSD 200 into a locked position during the data set download process, during which the user may pursue other activities with assurance that the RSD will not be removed in the user's absence. The user may than disengage the RSD 200 from the port 80 by, for example, a key (not shown) or identification code supplied to the user by the device 10.

Still alternatively, the device 10 may include a supply unit 55 that is operable to store memory devices, such as RSDs. If desired by the user, the device 10 may store a requested data set on a memory device present in the supply unit 55 and subsequently dispense the memory device to the user. As such, a user without a storage medium but wishing to obtain a data set may purchase both the data set and the storage device on which the data set is stored from the device 10.

Still alternatively, the device 10, after identifying the requested data set and the target storage medium indicated by the user, may determine that the target medium has insufficient storage space or is otherwise unsuited to receive the requested data set. In this event, the CPU 70 may consult equipment specifications stored, for example, on the storage 50 or other location in order to identify equipment that the user may employ in order to receive the requested data set. The device 10 may then generate to the medium 15 a list of such equipment that the user may purchase from the device 10 or elsewhere.

In an embodiment, the requested data set (e.g., a digital multimedia content file) is encoded. Accordingly, the device 10, when storing the requested data set on a target storage medium may further store thereon a decoding data set that, when executed, operates to decode the requested data set, thereby enabling presentation of the requested data set. Techniques by which content files and associated decoding data sets may be created and employed by, for example, the device 10 are described in commonly owned U.S. patent application Ser. No. 10/848,224, titled "MULTIMEDIA STORAGE SYSTEMS AND METHODS," and filed May 17, 2004, the entirety of which is hereby incorporated by reference.

Storage 50 may include a plurality of player/decoder program files and may also include a plurality of decryption program files. Each player/decoder program is a different version of the same decoder software and is compatible with a respective different type of electronic system, and/or is compatible with a respective different operating system employable by an electronic system such as the client device 30. Moreover, the decoder, of which each player/decoder program is a different version, corresponds to the scheme used to encode a file (or data set), such as a digital audio file or digital multimedia content file, and is thus required in order to decode the file (or data set). Similarly, each decryption program is a different version of the same decryption software and is compatible with a respective different type of electronic system, and/or is compatible with a respective different operating system employable by an electronic system such as the client device 30. Moreover, the decryption software, of which each decryption program is a different version, corresponds to the scheme used to encrypt the file (or data set), and is thus required in order to decrypt the file (or data set).

The client device 30 may be a handheld device. Handheld device operating systems typically contain instructions enabling an inserted or associated memory card to run an autoexecute/autoload program on the device. According to an embodiment of the present invention, the memory 120 in client device 30 is partially formatted using a file allocation table (FAT) format per the standard for an MMC card. Using this file format, a directory is made and named for a host device such as the client device 30. This directory includes at least one autoloading program compatible with the particular type of the client device 30 and may include several programs, each of which may be compatible with a respective different electronic system and/or operating system associated therewith.

The device 10 may otherwise provide digital rights management (DRM) and content protection for all the contained and dispensed content by employing systems already in place for content protection/DRM such as that standardized by Internet Groups and the International Telecommunications Union (ITU). Every data set dispensed will contain its own serial number so that unauthorized use may be traced and prosecuted. The serial number cannot be changed without at the same time erasing as least some of the content of the data set. The data sets (e.g., digital multimedia content files) transmitted to the customer's storage media device may also be constrained to play from that device only. If the attempt is made by the customer to copy the media onto any other storage than that originally dispended onto, the media will not play.

For example, a content anti-copy mechanism may be used when writing content to memory cards, whereby the serial number of the memory device is utilized. This process requires that the serial number of the card be read by the device 10 and then written onto the card as part of the data set, as well as loaded with the data player/decoder on the card.

Should the card data be subsequently copied on to another medium such as a second programmable flash card, the files would not play since the new card would have a different serial number from the original. Thus the card would act as a dongle preventing play of the data by its own self-contained player. Use of video players on a playing device (e.g., cell phone) would not permit this manner of anti-copy protection.

The number of plays that will be allowed for a given price may be accommodated by the device 10, such that, for example, a rental movie can be played but once (or N times) as contrasted against a music video which would normally receive unlimited plays.

This limitation whereby the number of plays may be limited in a pay per view application may be achieved by utilizing rewritable cards such as flash memory cards. Read-only and write once flash cards may not be employed for this method. The device 10 may, when reading a card, be able to determine whether the card is a multi-time programmable card. In the event that the card is programmable, the software associated with the player accompanying the data set will implement a count down on play cycles and write the same to the card upon the completion of each play. When the N-views have been counted for which N was paid, the player will limit the plays to that specified by reading and comparing the counts written on the card. The player may, after this limit has been reached, scramble the original data file.

When writing new content onto the customer's rewriteable disk storage media, the device 10 may automatically recognize and utilize storage areas on the storage device/card which have been previously used for content for which use has now expired. The device 10 will allow a customer to block files from being overwritten with new content by, for example, allowing the customer to specify the memory portions into which content should be written.

Other embodiments of the arrangement shown in FIGS. 1 and 2 are contemplated. For example, the client device 30 and device 10 may respectively include more or fewer than all of the components illustrated in FIG. 2. For example, if the device 10 and client device 30 communicate only via a wireless channel, then the device 10 may omit the port 80.

Figure 3:
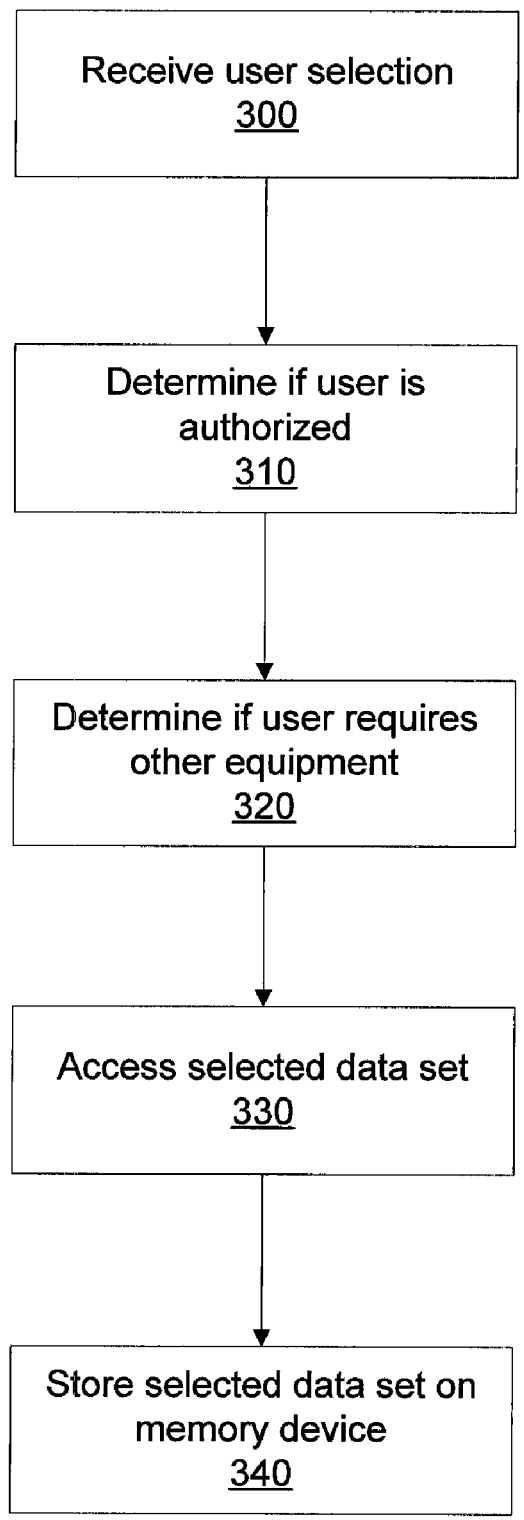
FIG. 3 is a flow diagram of a method according to an embodiment of the invention.

FIG. 3 illustrates a process of providing a data set according to an embodiment of the invention. Beginning at a step 300, a user wishing to receive a data set provides an indication of his/her data set selection to the device 10. After receiving an identification of the data set, at a step 310, the device 10 determines if the user is authorized to receive the data set (i.e., whether the user has paid for the data set). Subsequently, at a step 320, the device 10 determines whether the user has identified an appropriate target memory device or whether the user requires additional or other equipment. At a step 330, the device 10 accesses the requested data set. Subsequently, at a step 340, the device 10 stores the requested data set on the target memory device.

The conflux of several new technologies and trends lend themselves to embodiments of the invention described herein. For example, video and audio compression advances make it possible for near DVD quality movies with high-fidelity sound to be stored in a fraction of the storage earlier required (e.g., a 93 minute near DVD quality, movie can be stored with spare on a 512 MB USB Flash Drive). Thus on the internal storage of the device 10, where, for example, a terabyte (four 250-GB Disk Drives) can easily and inexpensively now be accommodated, thousands of movies, music videos and high quality audiotracks can be accessed.

The device 10 may dispense content encoded in technology other than that employed in DVD movies or on CD players. The decoder contained with a data set is utilized by the general purpose processor of the computing platform to decode and render the video/audio and must be adaptable to operating system and "playing platform" CPU and video configuration. The decoder will not be specified for any particular "standard" and may be anything which renders good quality. The owner or administrator of the device 10 may provide for the encoding of the data and provide DRM/content protection to the satisfaction of the content owner/licensor. Provision may be made for license fees/per dispensation to be collected by the device 10 owner and paid to the content owner.

Inexpensive rewriteable digital memory forms promote implementation of embodiments of the invention described herein. Principally flash memory and its successors, which were pioneered for digital cameras, have now penetrated into the computer memory field and are the storage form of choice for portable applications as evidenced by their embrace by PDA's, cell phones, and now are the desktop/laptop portable storage form of choice. Capacities on the market already are in the 4 GB/device range, enough to accommodate many movies at a time. The I/O data rates of these memories are also already such that a 90 minute movie could be loaded from the device 10 onto a memory within a matter of less than 10 seconds at the nominal rates (400+ Mbps). Not all memory forms may be that rapid, and may require more time to load a 90-minute movie. Locks known in the art that prevent removal of consumer storage devices absent an unlock code or physical security identification means, such as a key, may be provided in connection with the device 10, and allow the consumer to walk around the store, e.g., supermarket, during the content download.

High speed general purpose computing processors with video output capability now exist in all computing platforms, such as desktops, laptops, PDA's and cellphones. Some devices are already on the market for reading memory cards and converting the output for input to a TV set (e.g., Vosonic Digiviewer 3020).

Advanced audio processing now exists to convert a normal stereo signal into high-fidelity sound without adding significant bandwidth to the coded signals. These technologies promise new form for earlier released sound tracks.

Computer program code for carrying out operations of embodiments of the present invention, such as, for example, the described operation of the CPU 70, may be written in an object-oriented programming language, such as JAVA, Smalltalk, or C++. Computer program code for carrying out these operations may also, however, be written in conventional procedural programming languages, such as the C programming language or compiled Basic (CBASIC). Furthermore, some modules or routines may be written in assembly language or even micro-code to enhance performance and/or memory usage. In addition, at least one carrier signal may be modulated with computer program code for carrying out the described operations.

The preceding discussion is presented to enable a person skilled in the art to make and use the invention. Various modifications to the disclosed embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claims is:

1. A content vending device, comprising:
   memory storing a plurality of data sets and a plurality of computer programs, each of the computer programs compatible with a respective operating system of a multiplicity of distinct operating systems, each of the computer programs for execution by a respective target device, having the operating system with which the computer program is compatible, for enabling performance of a data set stored on the target device; and
   at least one interface to transfer information to the target device in response to a user selection of a respective data set of the plurality of data sets, the target device comprising a portable device having a respective operating system that is one of the multiplicity of operating systems; the information transferred to the target device including (A) the respective user-selected data set, and (B) a computer program of the plurality of computer programs that is compatible with the operating system of the target device;
   the content vending machine further configured:
      to determine whether the target device has sufficient space to store the respective user-selected data set and the computer program compatible with the operating system of the target device;
      upon determining that the target device has insufficient space, to provide a list of storage devices available for purchase from the self-contained vending device; and
      upon determining that the target device has sufficient space, to transfer the respective user-selected data set and the computer program compatible with the operating system of the target device;
      wherein the data set transmitted to the target device is constrained to play from only the target device.

2. The content vending device of claim 1, wherein the target device is a cell phone or personal digital assistant or hand held electronic device.

3. The content vending device of claim 2, wherein the target device includes a removable storage device.

4. The content vending device of claim 1, wherein the plurality of data sets comprises digital multimedia content.

5. The content vending device of claim 1, wherein the plurality of computer programs comprises decoder software and decryption software for decoding and decrypting data sets.

6. The content vending device of claim 5, wherein the decoder software and decryption software comprises an autoload program executable by the operating system on the target device.

7. The content vending device of claim 1, wherein the device comprises a self contained vending machine.

8. The content vending device of claim 1, further comprising a user interface configured to receive user selection of a requested data set.

9. The content vending device of claim 8, wherein the user interface is further configured to receive payment for content.

10. The content vending device of claim 9, wherein the user interface is further configured to receive identification of the target device.

11. The content vending device of claim 1, wherein the device interface is configurable to transfer to the target device an encoded data set and a decoder compatible with the operating system of the target device.

12. The content vending device of claim 11, wherein the encoded data set includes a limited number of plays.

13. The content vending device of claim 12, wherein the decoder in the encoded data set comprises a count down of the number of plays and a total of remaining plays on the target device.

14. The content vending device of claim 11, wherein the at least one interface includes a wireless interface to transmit content to the target device.

15. The content vending device of claim 11, wherein the at least one interface includes an interface to transmit content over a cable to the target device.

16. The content vending device of claim 11, wherein the at least one interface includes an interface to write data to a storage memory compatible with the target device.

17. The content vending device of claim 1, wherein the content vending device is configured to utilize an anti-copy mechanism that utilizes a serial number of the target device when transferring the data set to the target device.

18. The content vending device of claim 1, wherein content vending device is configured to include a serial number of the target device as part of the data set transferred to the target device.

19. The content vending device of claim 1, wherein the computer program transmitted to the target device includes an anti-copy mechanism that utilizes a serial number of the target device.

20. A method of dispensing content, comprising:
   in a self-contained vending device:
   storing a plurality of data sets and a plurality of computer programs, each of the computer programs compatible with a respective operating system of a multiplicity of distinct operating systems, each of the computer programs for execution by a respective target device, having the operating system with which the computer program is compatible, for enabling performance of a data set stored on the target device; and
   in response to a user selection of a respective data set of the plurality of data sets:
      determining whether a target device, comprising a portable device having a respective operating system that is one of the multiplicity of operating systems, has sufficient space to store the respective user-selected data set and a computer program of the plurality of computer programs that is compatible with the operating system of the target device;
      upon determining that the target device has insufficient space, providing a list of storage devices available for purchase from the self-contained vending device; and upon determining that the target device has sufficient space, transferring information to the target device; the information transferred to the target device including (A) the respective user-selected data set, and (B) the computer program of the plurality of computer programs that is compatible with the operating system of the target device;

wherein the data set transmitted to the target device is constrained to play from only the target device.

21. The method of claim 20, wherein the target device is a cell phone or personal digital assistant or hand held electronic device.

22. The method of claim 20, further including receiving user selection of a requested data set, the information transferred to the target device including the requested data set, and receiving or confirming payment for the requested data set.

23. The method of claim 20, including transferring to the target device an encoded data set and a decoder compatible with the operating system of the target device.

24. The content vending device of claim 1, wherein each of the computer programs for execution by the respective target device is for enabling performance and rendering of a data set stored on the target device.

25. The method of claim 20, wherein each of the computer programs for execution by the respective target device is for enabling performance and rendering of a data set stored on the target device.

26. The method of claim 20, wherein the self-contained vending device is configured to utilize an anti-copy mechanism that utilizes a serial number of the target device when transferring the data set to the target device.

27. The method of claim 20, wherein the self-contained vending device is configured to include a serial number of the target device as part of the data set transferred to the target device.

28. The method of claim 20, wherein the computer program transmitted to the target device includes an anti-copy mechanism that utilizes a serial number of the target device.

* * * * *